(12) United States Patent
Yan et al.

(10) Patent No.: US 8,107,439 B2
(45) Date of Patent: Jan. 31, 2012

(54) METHOD AND APPARATUS OF PHYSICAL RESOURCE ALLOCATION, METHOD OF DATA RECEIVING, AND RECEIVING END

(75) Inventors: Yuan Yan, Beijing (CN); Anxin Li, Beijing (CN); Xiangming Li, Beijing (CN); Hidetoshi Kayama, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 415 days.

(21) Appl. No.: 12/396,253

(22) Filed: Mar. 2, 2009

(65) Prior Publication Data

US 2009/0232073 A1    Sep. 17, 2009

(30) Foreign Application Priority Data

Mar. 12, 2008 (CN) .......................... 2008 1 0082764

(51) Int. Cl.
*H04W 4/00* (2009.01)
(52) U.S. Cl. ..................... 370/332; 370/204; 370/331
(58) Field of Classification Search .................. 370/334, 370/431, 332, 204, 331; 455/69, 226.2
See application file for complete search history.

(56) References Cited

U.S. PATENT DOCUMENTS

| | | | |
|---|---|---|---|
| 6,192,067 B1 * | 2/2001 | Toda et al. ..................... | 375/144 |
| 6,574,235 B1 * | 6/2003 | Arslan et al. .................. | 370/464 |
| 7,075,916 B2 * | 7/2006 | Kim et al. ..................... | 370/342 |
| 7,394,879 B2 * | 7/2008 | Narayan et al. ............... | 375/346 |
| 7,653,028 B2 * | 1/2010 | Shiu et al. .................... | 370/335 |
| 7,933,346 B2 * | 4/2011 | Yin et al. ...................... | 375/260 |

* cited by examiner

*Primary Examiner* — Ricky Ngo
*Assistant Examiner* — Dewanda Samuel
(74) *Attorney, Agent, or Firm* — Blakely, Sokoloff, Taylor & Zafman LLP (57) ABSTRACT

The present invention discloses a method and apparatus of physical resource allocation as well as a method of data receiving and a receiving end in a wireless communication system. The method of physical resource allocation includes: detecting a pilot signal sent by each user within a designated range; obtaining received power of the pilot signal sent by each user; scheduling each user within the designated range to obtain a user group including at least one user according to the received power; and allocating a same physical resource to each user of the user group. According to the method and the apparatus, it is possible to reuse a physical resource and sequentially decode data packets corresponding to users in a user group occupying the same physical resource according to the Capture Effect and interference cancellation technology, thereby improving the spectrum efficiency and throughput of uplink or downlink greatly.

4 Claims, 7 Drawing Sheets

METHOD AND APPARATUS OF PHYSICAL RESOURCE ALLOCATION, METHOD OF DATA RECEIVING, AND RECEIVING END

PRIORITY

The present application claims priority to and incorporates by reference the entire contents of Chinese patent application, No. 200810082764.4, filed in China on Mar. 12, 2008.

FIELD OF THE INVENTION

The present invention relates to wireless communication technologies, and more particularly to a method and apparatus of uplink or downlink physical resource allocation, a method of data receiving as well as a receiving end in a wireless communication system.

BACKGROUND OF THE INVENTION

With the rapid development of wireless communication technologies, people are demanding higher and higher transmission speed provided in the limited spectrum band. Therefore, how to improve spectrum efficiency on the uplink or downlink in the cellular wireless communication system in order to improve the cell throughput has become one of hot problems in the cellular wireless communication system.

SUMMARY OF THE INVENTION

A method and apparatus of physical resource allocation, a method of data receiving, and a receiving end are described. In one embodiment, the method comprises detecting a pilot signal sent by each user within a designated range; obtaining received power of the pilot signal sent by each user; scheduling each user within the designated range to obtain a user group including at least one user according to the received power; and allocating a same physical resource to each user in the user group.

BRIEF DESCRIPTION OF THE DRAWINGS

Exemplary embodiments of the present invention are hereinafter described in detail with reference to accompanying drawings in order to make the above characteristics and merits thereof more apparent to those skilled in the art; in the accompanying drawings.

DETAILED DESCRIPTION OF THE INVENTION

To solve the above technical problem, embodiments of the present invention provide a method and apparatus of physical resource allocation in a wireless communication system, which can improve the spectrum efficiency and cell throughput in the wireless communication system, especially for the uplink spectrum efficiency, by reusing the physical resources in the wireless communication system.

Based on the method of physical resource allocation, embodiments of the present invention further provide a method of data receiving and a receiving end in a wireless communication system, which can realize correct data receiving while the physical resources are reused in the wireless communication system.

According to an embodiment of the present invention, a method of physical resource allocation in the wireless communication system includes:

detecting the pilot signal sent by each user within a designated range;

obtaining received power of the pilot signal sent by each user;

scheduling each user within the designated range according to the received power to obtain a user group including at least one user; and allocating the same physical resource to each user in the user group.

The above user scheduling includes: forming at least one user group with at least one of dividing all users within the designated range into at least one user group; and selecting a user group having highest spectrum efficiency from the at least one user group according to the received power of said each user.

According to an embodiment of the present invention, the forming the at least one user group with the at least one of all the users within the designated range includes: selecting any two users from the users to be scheduled to form a user group randomly; and taking a user having the highest received power of all the users to be scheduled as a user group.

According to an embodiment of the present invention, the forming the at least one user group with the at least one of all the users within the designated range includes: taking a user having the highest received power of all the users to be scheduled as a user group; and forming a user group with the user having the highest received power and each of the other users.

According to an embodiment of the present invention, the forming the at least one user group with the at least one of all the users within the designated range includes: calculating PF metrics of all the users to be scheduled, and taking the user having the maximum PF metric of all the users to be scheduled as a user group; wherein a PF metric of a user is defined as $$\frac{r}{\overline{R}},$$

r representing the instantaneous throughput of the user and $\overline{R}$ representing the average throughput of the user;

forming multiple groups each of which includes any two users selected randomly from all the users to be scheduled, calculating the PF metric of each user group, and taking the user group with the maximum PF metric as the scheduled user group; wherein the PF metric of each of the multiple groups is defined as $$\frac{r_1}{\overline{R_1}} + \frac{r_2}{\overline{R_2}},$$

r1 and r2 representing the instantaneous throughput of the two users respectively in the case that the two users are paired as a group, and $\overline{R_1}$ and $\overline{R_2}$ representing the average throughput of the two users respectively.

The selection of the user group with the highest spectrum efficiency from the at least one user group according to the received power of each user includes: estimating a Signal-Interference-Noise Ratio (SINR) of each user according to the received power by supposing that a sent signal of each user of each user group is overlapped with one another;

calculating spectrum efficiency of each user group according to the SINR; and selecting the user group having the highest spectrum efficiency from all user groups.

In one embodiment, the above physical resource is a physical resource block, PRB, occupying the same frequency time resource.

In one embodiment, the above designated range is a serving area covered by one base station or more than two antenna elements configured dispersedly.

According to an embodiment of the present invention, an apparatus of physical resource allocation in a wireless communication system includes:

a pilot detection unit, configured to detect a pilot signal sent by each user within a designated range, and obtain received power of the pilot signal sent by said each user; a user scheduling unit, configured to schedule said each user within a designated range according to the received power to obtain a user group including at least one user; and a resource allocation unit, configured to allocate a same physical resource to each user in the user group.

In one embodiment, the user scheduling unit includes:

a grouping module, configured to form at least one user group with at least one of all users within the designated range;

a Signal-Interference-Noise Ratio (SINR) estimation module, configured to estimate an SINR of each user according to the received power by supposing that a sent signal of each user of each user group is overlapped with one another;

a group selection module, configured to calculate spectrum efficiency of each user group according to the SINR, and select a user group having highest spectrum efficiency from all user groups.

According to an embodiment of the present invention, a method of data receiving in a wireless communication system includes:

removing the first data packet from the first signal to generate a second signal if the first signal includes signals of more than two users; and demodulating and decoding the second signal to obtain a second data packet of a user having highest received power from the second signal, and taking the second signal as a new first signal which is processed similar to the first signal.

The removing the first data packet includes:

modulating the first data packet to regenerate a sent signal of the user having the highest received power; convoluting the regenerated sent signal and a channel impulse response corresponding to the user, and restoring a received signal of the user received by a base station in a channel condition in which the sent signal is sent; and subtracting the restored received signal from the first signal.

Preferably, the method further includes: determining whether the number of data packets decoded successfully meets a requirement of fountain decoding;

if the number of the data packets decoded successfully does not meet the requirement of the fountain decoding, performing said removing the first data packet from the first signal to generate the second signal;

if the number of data packets decoded successfully meets the requirement of the fountain decoding, performing the fountain decoding for the data packets decoded successfully to obtain a whole data frame sent by a corresponding user, restoring a correct data packet which is unsuccessfully decoded before according to correlation between data packets, and performing said removing based on the restored correct data packet.

According to an embodiment of the present invention, a receiving end in a wireless communication system includes:

a demodulation unit, configured to demodulate and decode a first signal to obtain a first data packet of a user having highest received power;

an interference cancellation unit, configured to remove the first data packet from the first signal if the first signal includes signals of more than two users to generate a second signal, and input the second signal to the demodulation unit again as a new first signal.

The receiving end further includes: a fountain decoding unit connected with the demodulation unit and the interference cancellation unit, configured to perform fountain decoding for the first data packet to obtain a whole data frame sent by the user, decode a data packet which is not decoded successfully again according to correlation between data packets to restore a correct data packet, and send the first data packet and the restored correct data packet to the interference cancellation unit.

The method for reusing the physical resources, the apparatus of physical resource allocation and the receiving end all make use of far-near effect of a cellular system and frequency-selective fading of a multi-carrier system to schedule the users. Each user terminal may send data using their maximum transmission power without a complicated power control mechanism. Therefore, the user does not need to lower its transmission power and performance loss may thus be avoided. Therefore, the larger the number of users is, the more the choices are; and thus, greater gains of system throughput are obtained. In addition, the interference cancellation is performed for each user by fountain codes, which, to some extent, solves the problem that a user having lower power can not be decoded if a user having higher power is decoded unsuccessfully. Therefore, the performance of the user having the lower power is further improved.

The above method of data receiving and the receiving end in the wireless communication system decode data packets corresponding to users in a group occupying the same physical resource one by one according to the Capture Effect and interference cancellation technology. And physical resources are reused, and therefore the spectrum efficiency and throughput of a wireless communication system are improved greatly.

In addition, an embodiment of the present invention further provides a scheme for selecting user pairs as well as corresponding modulation and coding modes during user scheduling. Further more, according to a scheme of interference cancellation for multiple users by use of fountain coding and a scheme of further improving system uplink throughput by use of fine power control to the users, the spectrum efficiency and throughput of the wireless communication system are improved.

The present invention is further described in detail hereinafter with reference to the accompanying drawings in order to make the technical solution and merits thereof more apparent.

In a wireless communication system, even if multiple wireless data packets arrive at a base station at the same time, i.e. multiple wireless data packets are in a collision with one another, the base station still can successfully demodulate and decode a wireless data packet with the highest received power if the wireless data packet with the highest received power still meets a requirement of a receiver of the base station for Signal-Interference-Noise Ratio (SINR). This is an inherent phenomenon in the wireless communication system, which is referred to as Capture Effect. The present invention makes use of the Capture Effect in order to realize the reuse of uplink or downlink physical resources.

Figure 1:
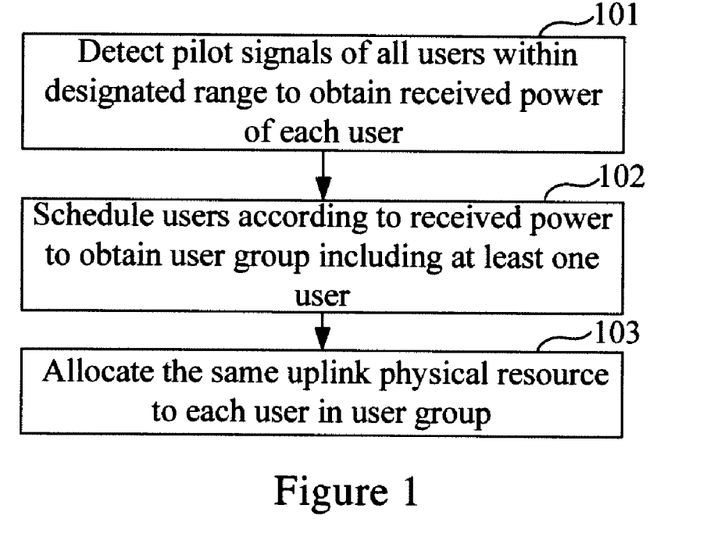
FIG. 1 is a flowchart illustrating a method of uplink physical resource allocation according to an embodiment of the present invention.

FIG. 1 is a flowchart illustrating a method of uplink physical resource allocation according to an embodiment of the present invention. Referring to FIG. 1, the method of uplink physical resource allocation according to an embodiment of the present invention mainly includes the following.

Block 101: Pilot signals of all users within a designated range are detected and received power of each of the users is obtained.

In the method of uplink physical resource allocation according to this embodiment of the present embodiment, the designated range refers to a serving area covered by one base station.

Block 102: The users are scheduled according to the received power of each of the users to obtain a user group including at least one user.

Block 103: The same uplink physical resource is allocated to each user in the user group.

In this embodiment, the uplink physical resource may be a Physical Resource Block (PRB) which is defined by a sub-carrier and a time slot in an OFDM system and which occupies the same frequency-time resource block; or the uplink physical resource may be a physical resource allocated by other wireless communication systems.

According to Blocks 101-103 above, the base station realizes the process of uplink physical resource allocation. In this way, users in the user group may share the same uplink physical resource allocated by the base station to the users in the user group. In other words, the users in the user group may send uplink data packets at the same time on the uplink physical resource allocated to the users in the user group.

As can be seen from the above process, how the base station schedules the users to obtain the user group according to the received power of each user in Block 102 is one of key techniques in the embodiment of the present invention. In practical applications, multiple user scheduling schemes, such as Greedy scheduling or PF scheduling, may be used to schedule all the users within the coverage area of the base station. However, no matter which user scheduling scheme is used, received signal power of the users in the user group should meet the requirement of the Capture Effect. In other words, for each signal, if interference cancellation is performed for all the other signals having received power higher than that of the signal and if all the other signals having received power lower than that of the signal are regarded as noises, the SINR of the signal may be still higher than a threshold at which a receiving end can perform decoding correctly, i.e. the SINR of the signal satisfies a condition of equation (1) as follows:

$$SINR_i = \frac{P_{s\_i}}{\sum_{j=1}^{i-1} P_j + \sum_{j=i+1}^{N} P_{sr\_j} + P_n} \geq T \qquad (1)$$

where $SINR_i$ represents the SINR of the ith user of N users which are sequenced according to the received power from the lowest to the highest; $P_{s\_i}$ represents the received power of the ith user;

$$\sum_{j=1}^{i-1} P_j$$

represents the sum of power of all signals having the received power lower than $P_{s\_i}$;

$$\sum_{j=i+1}^{N} P_{sr\_j}$$

represents the sum of power of remaining signals after the interference cancellation is performed for all signals having the received power higher than $P_{s\_i}$; $P_n$ represents noise energy; and T represents the threshold of the SINR.

According to the Capture Effect, as long as the SINR of a signal satisfies the condition of equation (1), the receiver of the base station can decode the signal to obtain the data packet sent by a corresponding user.

As can be proved by practice, with the increase of the number of users in a user group, both the user scheduling algorithm and the receiver will become far much more complicated. The uplink spectrum efficiency may be improved greatly if the user group includes at most two users. By simulation, it is found that gains obtained when the user group includes two users are the most while the gains obtained when the user group includes more than two are improved little due to the affection of error propagation and channel remaining error. Further, when the user group includes more than two users, the user scheduling algorithm is far much more complicated. Therefore, in view of calculation complexity and Bit Error Rate (BER) performance of a link, the user group preferably includes two users at the most in an embodiment of the present invention. Hereinafter, the process of scheduling the users according to the received power of each user to obtain the user group from all the users within the coverage area of the base station in Block 102 is described in detail with reference to the accompanying drawings by supposing that each user group includes two users at the most.

Various scheduling schemes are hereinafter described in detail.

Scheduling Scheme 1: Greedy Scheduling

Figure 2:
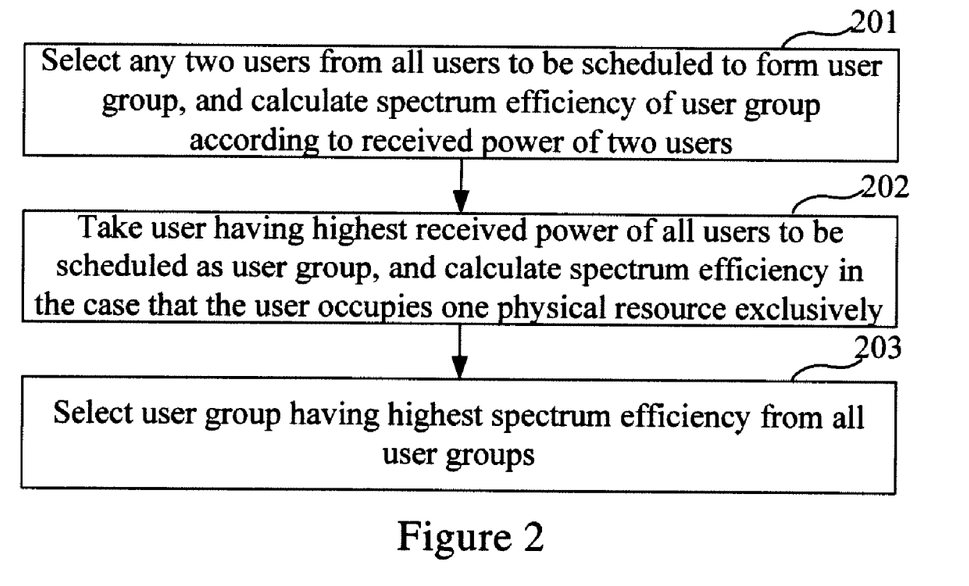
FIG. 2 is a flowchart illustrating a Greedy scheduling scheme according to an embodiment of the present invention.

FIG. 2 is a flowchart illustrating a Greedy scheduling scheme according to an embodiment of the present invention. Referring to FIG. 2, the scheduling scheme 1 is described below.

Block 201: Any two users U1 and U2 are selected from all users to be scheduled to form a user group, and the sum of spectrum efficiency of the two users in the case that the two users occupy the same physical resource at the same time is calculated according to the received power of the two users. The sum is referred to as the spectrum efficiency of the user group. In this Block, any two users of all the users to be scheduled are included into one user group in order to form all the candidate user groups to be scheduled.

In the case that the two users occupy the same physical resource at the same time, the SINR of user U1 corresponding to a signal having higher received power may be calculated according to equation (2) below.

$$SINR_{U1} = \frac{P_{s\_U1}}{P_{s\_U2} + P_n} \quad (2)$$

where $P_{s\_U1}$ and $P_{s\_U2}$ are the received power of the signals corresponding to users U1 and U2 respectively received by the base station; $P_n$ represents noise power.

The SINR of user U2 corresponding to a signal having lower received power may be calculated according to equation (3) below.

$$SINR_{U2} = \frac{P_{s\_U2}}{P_{sr\_U1} + P_n} \quad (3)$$

where $P_{s\_U2}$ is the received power of the signal which corresponds to user U2 and is received by the base station; $P_n$ is the noise power; and $P_{sr\_U1}$ is remaining signal power due to channel estimation error after the interference cancellation is performed for the signal corresponding to user U1.

As described above, after the SINRs of users U1 and U2 are obtained respectively, supportable modulation and coding modes for users U1 and U2 respectively may be obtained by, for example, EESM mapping; and the spectrum efficiency respectively corresponding to users U1 and U2 may thus be obtained. Then the spectrum efficiency of the user group including users U1 and U2 may be obtained by calculating the sum of the spectrum efficiency of users U1 and U2.

Block 202: The user having the highest received power among all the users to be scheduled is taken as a user group, and the spectrum efficiency in the case that the user having the highest received power occupies one physical resource exclusively is calculated.

Block 203: A user group having the highest spectrum efficiency is selected from all the user groups.

Figure 3:
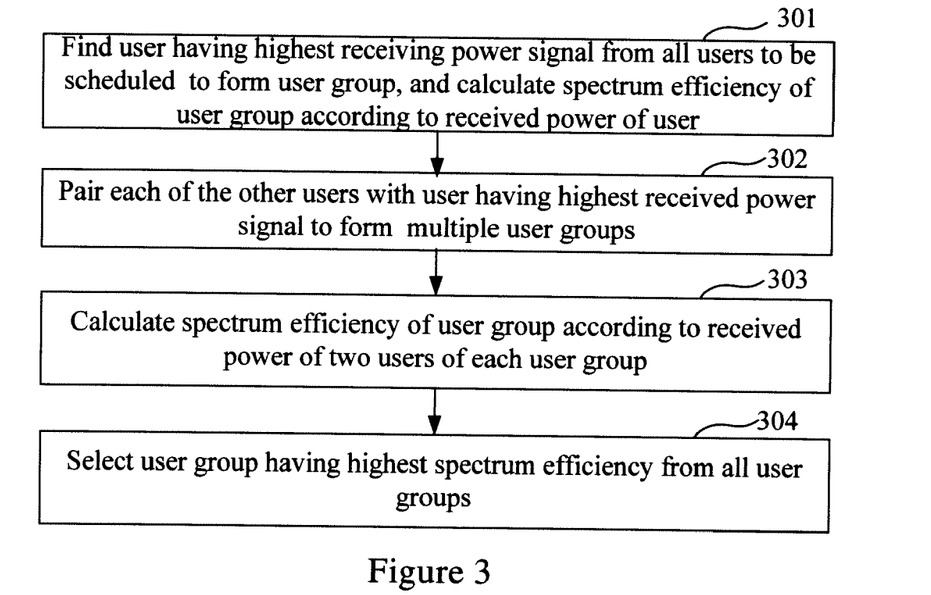
FIG. 3 is a flowchart illustrating another Greedy scheduling scheme according to an embodiment of the present invention.

FIG. 3 is a flowchart illustrating another Greedy scheduling scheme according to an embodiment of the present invention. Referring to FIG. 3, the Greedy scheduling scheme mainly includes the following.

Block 301: A user having a highest received power signal is found from all the users to be scheduled and is taken as a user group, and the spectrum efficiency in the case that the user occupies one physical resource exclusively is calculated according to the received power of the user.

Block 302: Each of the other users is paired with the user having the highest received power signal to form multiple user groups.

Block 303: The sum of spectrum efficiency of two users of each user group in the case that the two users occupy the same physical resource at the same time is calculated according to the received power of the two users. The sum is the spectrum efficiency S1+S2 of the user group.

The detailed implementation of Block 303 may refer to Block 201.

Block 304: A user group having the highest spectrum efficiency is selected from all the user groups.

Scheduling Scheme 2: PF Scheduling

Figure 4:
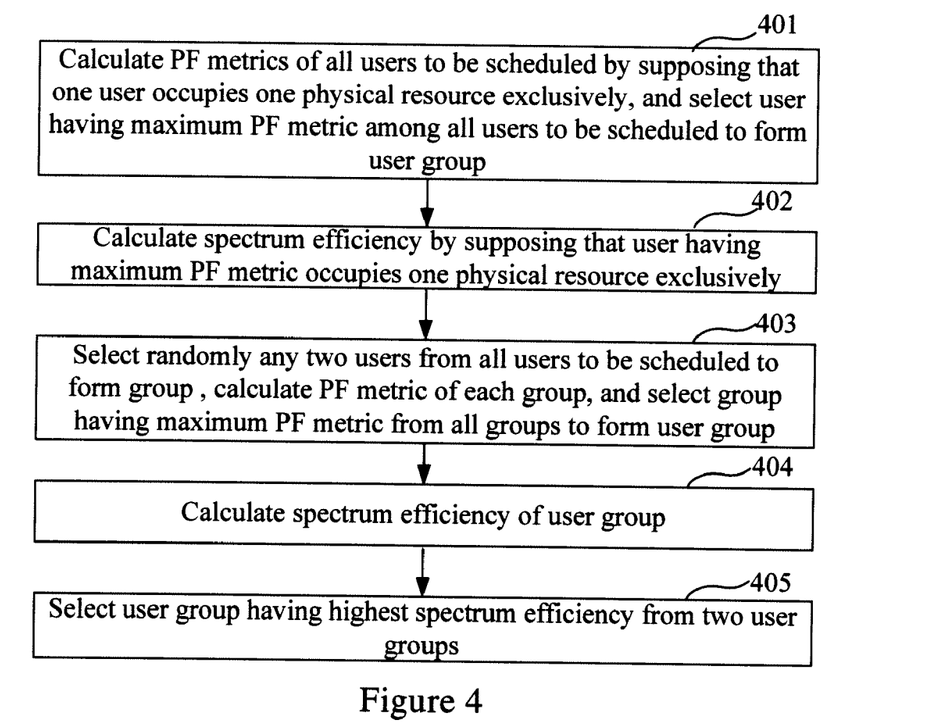
FIG. 4 is a flowchart illustrating a PF scheduling scheme according to an embodiment of the present invention.

FIG. 4 is a flowchart illustrating a PF scheduling scheme according to an embodiment of the present invention. Referring to FIG. 4, the PF scheduling scheme is described below.

Block 401: PF metrics of all users to be scheduled by supposing that one user occupies one physical resource exclusively are calculated, and a user having the maximum PF metric among all the users to be scheduled is selected to form a user group. The PF metric of a user is defined as $$\frac{r}{\overline{R}},$$

where r is instantaneous throughput of the user; $\overline{R}$ is average throughput of the user.

Block 402: The spectrum efficiency of the user having the maximum PF metric in the case that the user occupies one physical resource exclusively is calculated.

Block 403: Any two users U1 and U2 are randomly selected from all the users to be scheduled to form a group, and the PF metric of each group is calculated. A group having the maximum PF metric is selected from all groups to form a user group. The PF metric of the user group is defined as $$\frac{r_1}{\overline{R_1}} + \frac{r_2}{\overline{R_2}},$$

where r1 and r2 are instantaneous throughput of the two users U1 and U2 respectively in the case that the two users are paired as one couple; $\overline{R_1}$ and $\overline{R_2}$ are average throughput of the two users U1 and U2 respectively.

Block 404: The sum of spectrum efficiency of the two users of the user group in the case that the two users occupy one physical resource at the same time is calculated. The sum is the spectrum efficiency of the user group.

Block 405: A user group having the higher spectrum efficiency is selected from the two user groups formed in Block 401 and Block 403 respectively.

According to the scheduling schemes in FIGS. 2, 3 and 4, several user groups are firstly formed with at least one of the users to be scheduled; a user group having the highest spectrum efficiency is selected from the several user groups in order to schedule one user group for each physical resource respectively. Further, because these scheduling schemes take account of the parameter of the spectrum efficiency, it may be guaranteed that the scheduled user group has the spectrum efficiency relatively higher than or at least the same as the conventional method. As can be seen from the above, the process of selecting a user group having the highest spectrum efficiency from the at least one user group according to received power of each user may include: estimating the SINR of each user respectively according to the received power by supposing that sent signals of users in each user group are overlapped, calculating the spectrum efficiency of each user group according to the SINR respectively, and selecting the user group having the highest spectrum efficiency from all the user groups.

Figure 5:
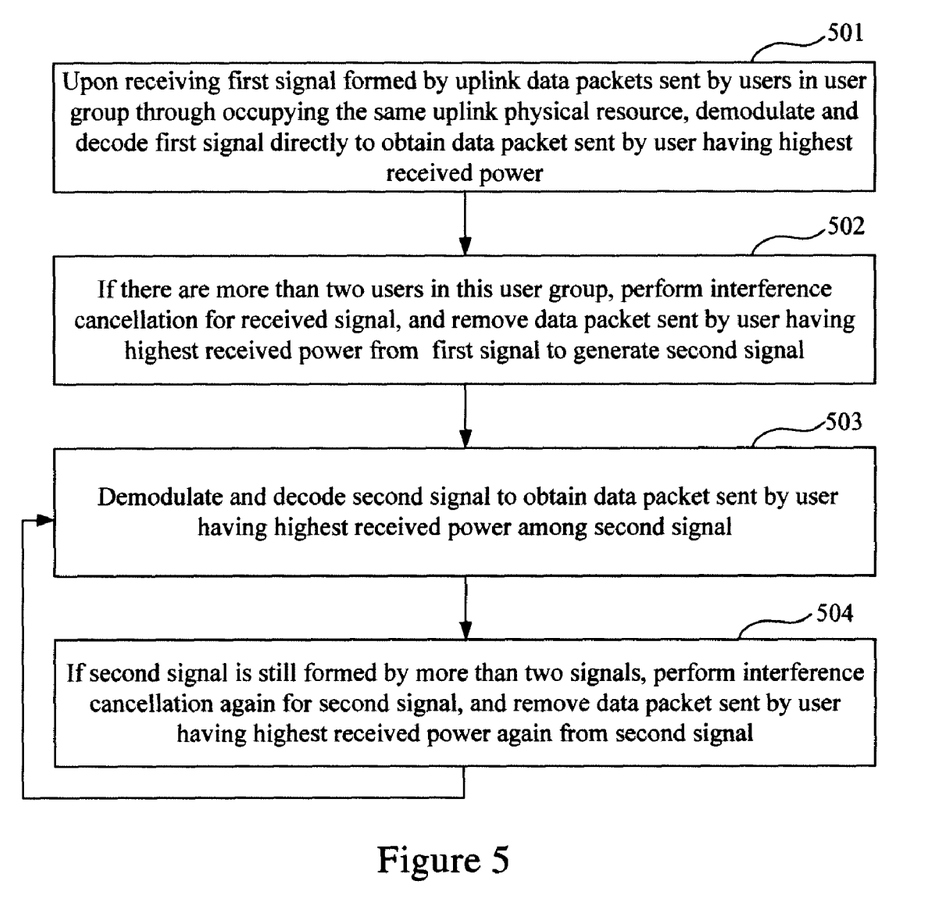
FIG. 5 is a flowchart illustrating a method of uplink data receiving according to an embodiment of the present invention.

Besides the method of uplink physical resource allocation, an embodiment of the present invention further provides a method of uplink data receiving based on the method of uplink physical resource allocation. Referring to FIG. 5, the method of uplink data receiving mainly includes the following.

Block 501: Upon receiving a first signal formed by uplink data packets sent by users in one user group through occupying the same uplink physical resource, a base station demodulates and decodes the first signal directly to obtain a data packet sent by a user having the highest received power.

In this Block, according to the Capture Effect, the base station can successfully decode the data packet sent by the user having the highest received power if the SINR of the signal having the highest received power meets the requirement of the receiver of the base station; while signals sent by the other users are referred to as the interference of this signal.

Block 502: If there are more than two users in the user group, interference cancellation is performed for the received signal according to the data packet sent by the user having the highest received power in Block 501. In other words, the data packet sent by the user having the highest received power is removed from the first signal, and a second signal is generated.

Because the base station can obtain channel impulse responses of all users by channel estimation, the interference cancellation may be performed for a user signal according to the data packet sent by the user, the data packet corresponding to the signal which is decoded successfully and which has the highest received power. Specifically, the process includes:

1) modulating the decoded data packet, and regenerating a sent signal of the user corresponding to the signal having the highest received power;

2) performing convolutions of the regenerated sent signal and the channel impulse response corresponding to the user, and restoring the user's received signal received by the base station in a channel circumstance in which the sent signal is sent;

3) subtracting the restored received signal from the originally received signal in order to obtain a second signal after the signal having the highest received power is removed.

Block 503: The second signal is demodulated and decoded to obtain a data packet sent by the user having the highest received power among the second signal.

Block 504: If the second signal is still formed by more than two signals, the interference cancellation is performed for the second signal according to the data packet of the user having the highest received power in Block 503. In other words, the data packet sent by the user having the highest received power is removed from the second signal, and Block 503 is performed again.

By performing Blocks 501-504 repeatedly, according to the Capture Effect and interference cancellation technology, the base station may detect the data packets sent by users in a user group through occupying the same uplink physical resource one by one. Accordingly, the uplink physical resource may be reused, thereby improving the uplink spectrum efficiency and throughput of the wireless communication system greatly.

As can be seen from the above, only if the signal with the highest received power is decoded successfully and the interference cancellation is performed for the signal, it is possible to decode the rest signals to obtain a signal having the second highest received power. In other words, if current signals are not successfully decoded, it is impossible to decode the current signals to obtain signals therein one by one. To avoid such a problem, the above method is improved in another embodiment of the present invention; in other words, a decoding correction is implemented by the fountain code encoding/decoding technology during the process of decoding. The decoding correction is hereinafter described in detail according to a preferred embodiment of the present invention.

The fountain code encoding refers to relevant fountain coding packets generated from k original data packets of a frame at the sending end, and the number of the relevant fountain coding packets is larger than k, ideally infinite. The fountain code decoding means that all the k original data packets can be recovered from fountain coding packets, as long as any m correct fountain coding packets in all fountain coding packets are received. In general, m is equal to or slightly larger than k. Upon decoding all the k original data packets of the frame successfully, the receiving end sends a fountain termination signal to notify the sending end that the receiving end has received the whole packets of the frame correctly. At this point, the sending end may start to send fountain coding packets of a new frame. As can be seen from the above process of fountain code encoding/decoding, an encoder of fountain codes functions like a fountain which continuously generates water drops (i.e. fountain packets) and a decoder of fountain codes functions like a cup receiving water drops from the fountain. The requirements for successful decoding can be fulfilled as long as the cup receives enough water drops regardless of which drops are received.

Figure 6:
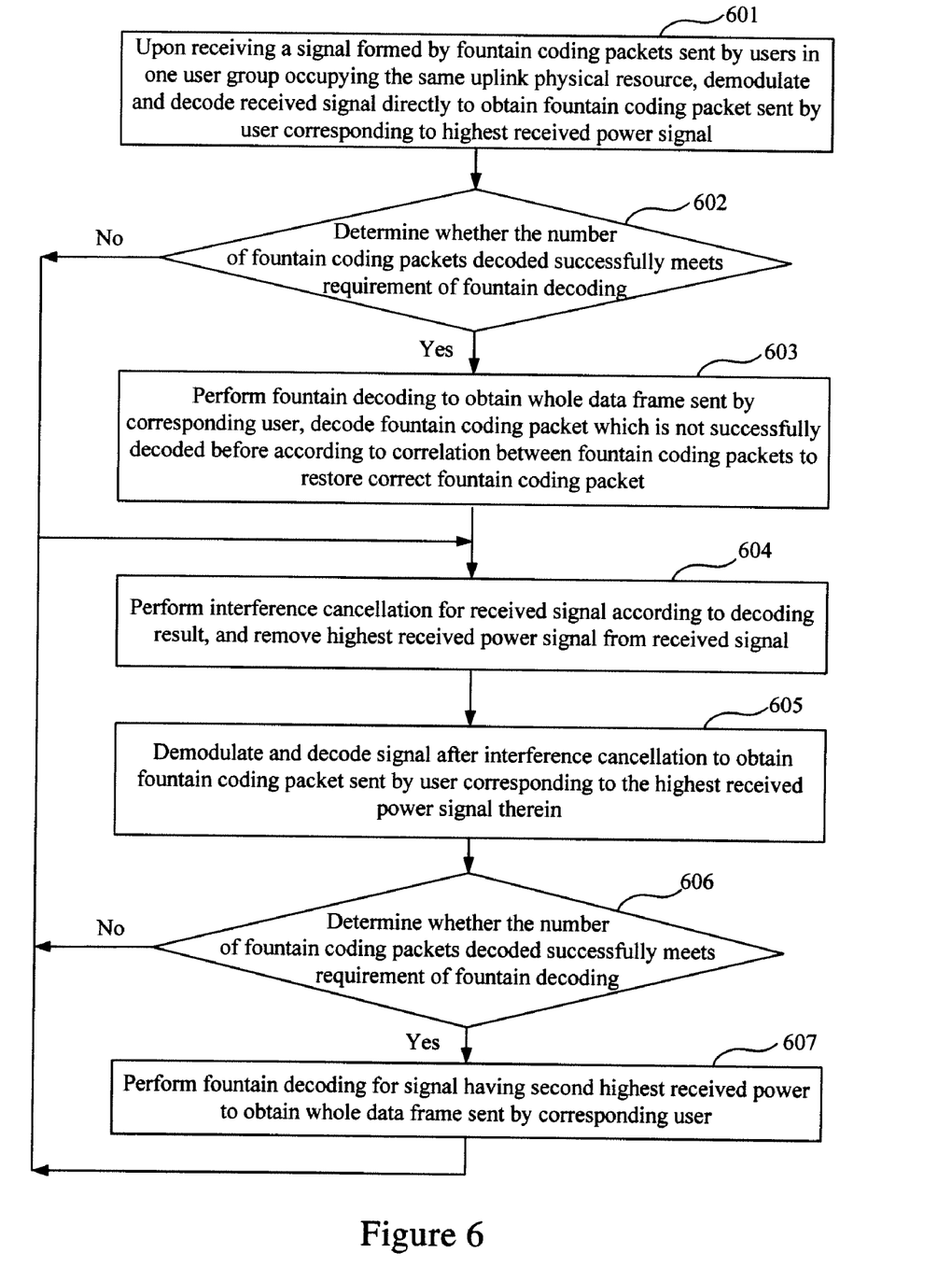
FIG. 6 is a flowchart illustrating a method of uplink data receiving according to another embodiment of the present invention.

FIG. 6 is a flowchart illustrating a method of uplink data receiving according to another embodiment of the present invention. As shown in FIG. 6, the above method mainly includes the following.

Block 601: Upon receiving a signal formed by fountain coding packets sent by users in one user group through occupying the same uplink physical resource, a base station demodulates and decodes the received signal directly to obtain a fountain coding packet sent by a user corresponding to a highest received power signal.

Block 602: A determination is made as to whether the number of fountain coding packets decoded successfully meets the requirement of fountain decoding. If the number of the fountain coding packets decoded successfully meets the requirement of fountain decoding, Block 603 is performed; otherwise, Block 604 is performed.

Block 603: The fountain decoding is performed for the signal having the highest received power to obtain all the data packets of the frame sent by the user corresponding to the highest received power signal, a fountain termination signal is sent to the corresponding user. A fountain coding packet which is not successfully decoded before is decoded again according to correlation between the fountain coding packets to restore a correct fountain coding packet, and Block 604 is performed.

Block 604: Interference cancellation is performed for the received signal according to a decoding result, and the highest received power signal is removed from the received signal.

In this Block, the interference cancellation is performed not only for the currently-received signal decoded successfully, but also for a received signal corresponding to the correct fountain coding packet restored in Block 603.

Block 605: The signal after the interference cancellation is demodulated and decoded to obtain the fountain coding packet sent by the user corresponding to the highest received power signal therein, i.e. the user corresponding to the second highest received power signal among all users.

Because the interference cancellation is performed not only for the currently-received signal but also for the signal which may not be successfully decoded before, in Block 605, it is not only possible to obtain the fountain coding packet sent by the user corresponding to the currently-received signal having the second highest received power, but also to restore the fountain coding packet sent by the user before.

Block 606: A determination is made as to whether the number of the fountain coding packets decoded successfully meets the requirement of fountain decoding; if the number of the fountain coding packets decoded successfully meets the requirement of fountain decoding, Block 607 is performed.

Block 607: The fountain decoding performed for the signal having the second highest received power to obtain the whole data frame sent by the user corresponding to the signal having the second highest received power, and a fountain termination signal is sent to the corresponding user.

After Block 607, if the signal after the interference cancellation is still formed by more than two signals, the above Blocks 604-607 are performed circularly to decode the received signal to obtain fountain coding packets sent by all users of the user group one by one; if the signal after the interference cancellation is not formed by more than two signals, the process is terminated.

As can be seen, according to the method of uplink data receiving in the above embodiment, the base station may detect the data packets sent by the users in one user group through occupying the same uplink physical resource one by one according to the Capture Effect and interference cancellation technology. Also the uplink physical resource may therefore be reused. Further, by fountain encoding/decoding mode, the base station may correctly restore the fountain coding packet decoded unsuccessfully before without another fountain coding packet sent by a user, and then the interference cancellation can be performed more effectively, and thereby further improving the uplink spectrum efficiency and throughput of the wireless communication system.

With reference to an example, the process of the base station performing the fountain code decoding by the method in the above embodiment is hereinafter described.

Suppose that a user group includes two users referred to as a first user and a second user respectively, where the signal of the first user has higher received power and the signal of the second user has lower received power. Uplink data packets sent by the two users are all encoded by fountain codes. It is further supposed that a base station can successfully decode one whole data frame sent by the first user upon receiving three successfully detected fountain coding packets of the first user, and decode one data frame sent by the second user upon receiving four fountain coding packets of the second user.

Suppose that the base station has received a signal formed by mixing three fountain coding packets sent by the first user respectively with three fountain coding packets sent by the second user. The first fountain coding packets sent by the two users and the third fountain coding packets sent by the two users are decoded correctly while the second fountain coding packets sent by the two users are decoded unsuccessfully (the unsuccessfully decoding of the second fountain coding packet of the first user results in the unsuccessfully decoding of the second fountain coding packet of the second user). Further, suppose that the base station has received a signal formed by mixing the fourth fountain coding packet sent by the first user with the fourth fountain coding packet sent by the second user and that the base station has decoded the fourth fountain coding packet sent by the first user successfully. At this point, according to Blocks 601-607, if the base station determines that the number of successfully-decoded fountain coding packets of the first user is three, i.e. meets the fountain decoding requirement of the first user, the base station performs the fountain code decoding for the first user to obtain the whole data frame sent by the first user. Further, the base station restores the unsuccessfully-decoded second fountain coding packet sent by the first user according to the received fountain coding packets. Then, the base station may send a fountain termination signal to notify the first user that the base station has received the whole data frame successfully and that the first user may send a next data frame. Meanwhile, the base station performs the interference cancellation for the received signal according to the successfully-decoded fourth fountain coding packet sent by the first user as well as the restored second fountain coding packet sent by the first user, and decodes the signal after the interference cancellation to obtain the fourth fountain coding packet and the second fountain coding packet sent by the second user. Together with the successfully-decoded first and third fountain coding packets sent by the second user, four fountain coding packets sent by the second user are decoded successfully by the base station, which meets the fountain decoding requirement of the second user and makes the whole data frame sent by the second user be decoded successfully. At this point, the base station may send a fountain termination signal to notify the second user that the base station has received the whole data frame successfully and the second user may send a next data frame.

As can be seen from the above process, after the uplink data packet is encoded by the fountain codes, the base station may restore an unsuccessfully-decoded data packet according to the fountain coding packets received correctly, thereby realizing the data packet correction, improving the effectiveness of interference cancellation, and further improving the uplink spectrum efficiency and throughput.

Besides, fine power control may further be used to improve the performance of the above method of physical resource reuse. For example, it is supposed that all users in a user group send data packets by their maximum power, where a user having the highest power uses a 64QAM modulation mode and a user having the second highest power uses a QPSK modulation mode. At this point, transmission power of the user having the highest power may be lowered to the lowest transmission power of the 64QAM modulation mode; and because the remaining interference error of the user having the highest power is lowered, the user having the second highest power may select a modulation mode having a higher data rate, such as a 16QAM modulation mode, thereby further improving the spectrum efficiency and throughput.

The method of uplink physical resource allocation described in the above embodiments may also be extended to the downlink reuse in some application environments. For example, in a distributed antenna system, because there is interference between antenna elements, generally only one user may be scheduled in a downlink PRB in a serving area formed by common coverage area of two or multiple (more than two) antenna elements configured dispersedly, for example a soft-frequency-reuse resource allocation mode provided in a LTE system. However, if there is great power difference between wireless links from the antenna elements to various users, a method similar to the above method of physical resource allocation in Blocks 101-103 in FIG. 1 may be used to group users within the common coverage area of two or multiple antenna elements according to the SINRs of the users. Further, a user group including more than two users is scheduled in the PRB and the same downlink physical resource is allocated to the users of the user group, and thus the reuse of the downlink physical resource is realized. At this point, according to the method of data receiving in Blocks 501-504 in FIG. 5 or Blocks 601-607 in FIG. 6, a user terminal, as a receiving end, may decode the data sent by each antenna element according to the Capture Effect and interference cancellation technology, and thereby improving the downlink spectrum efficiency and the downlink throughput.

Figure 7:
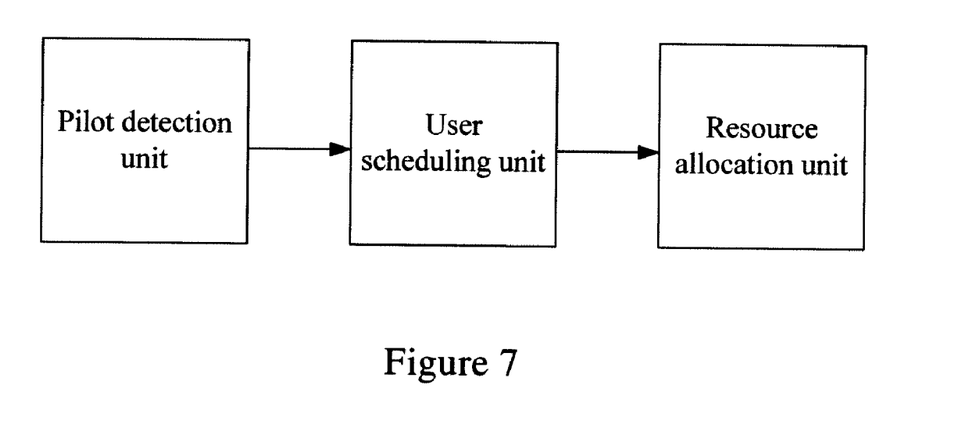
FIG. 7 is a schematic diagram illustrating an internal structure of an apparatus of physical resource allocation according to an embodiment the present invention.

Besides the above method of physical resource allocation in the wireless communication system, an embodiment of the present invention also provides an apparatus of physical resource allocation in a wireless communication system. FIG. 7 is a schematic diagram illustrating an internal structure of an apparatus of physical resource allocation according to an embodiment the present invention. As shown in FIG. 7, the apparatus mainly includes: a pilot detection unit, a user scheduling unit and a resource allocation unit.

The pilot detection unit is configured to detect a pilot signal sent by each user within a designated range, and obtain received power of the pilot signal sent by each user.

With respect to uplink physical resource allocation, the designated range is a serving area covered by one base station; with respect to downlink physical resource allocation, the designated range is a serving area covered by more than two antenna elements configured dispersedly.

The user scheduling unit is configured to schedule users to obtain a user group including at least one user according to the obtained received power.

The resource allocation unit is configured to allocate a same physical resource to each user of the user group.

As described above, the user scheduling unit may schedule the users by a Greedy scheduling scheme or a PF scheduling scheme. The user scheduling unit specifically includes:

a grouping module, configured to form at least one user group with at least one of all the users within the designated range;

a Signal-Interference-Noise Ratio (SINR) estimation module, configured to estimate an SINR of each user according to the received power by supposing that signals sent by users of each user group are overlapped with one another; and a group selection module, configured to calculate a spectrum efficiency of each user group according to the SINR, and select a user group having a highest spectrum efficiency from all user groups.

Figure 8:
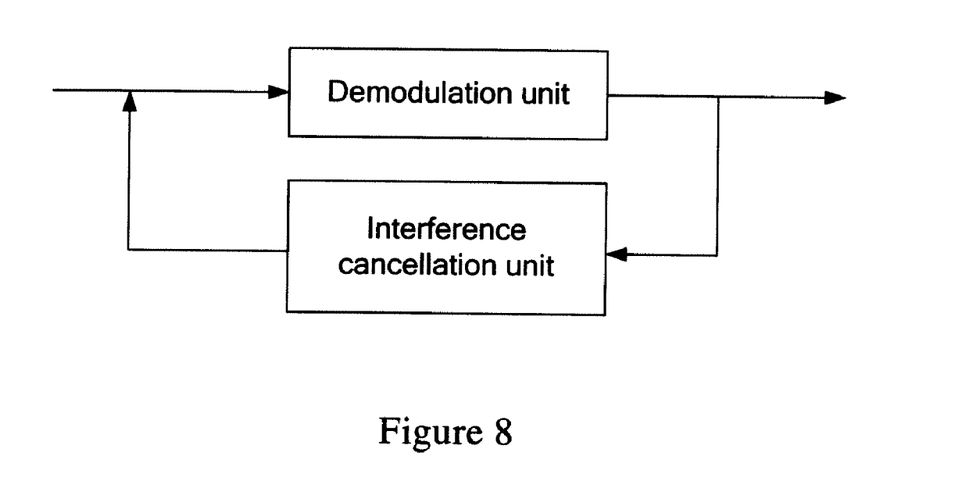
FIG. 8 is a schematic diagram illustrating an internal structure of a receiving end according to an embodiment the present invention.

An embodiment of the present invention further provides a receiving end of data receiving in a wireless communication system. In an uplink direction, the receiving end is a base station; while in the downlink direction, the receiving end is a user terminal. FIG. 8 is a schematic diagram illustrating an internal structure of a receiving end according to an embodiment the present invention. As shown in FIG. 8, the receiving end mainly includes:

a demodulation unit, configured to demodulate and decode a first signal received to obtain a data packet of a user having highest received power;

an interference cancellation unit, configured to remove the data packet obtained by the demodulation unit from the first signal if the first signal contains signals of more than two users to generate a second signal, and input the second signal to the demodulation unit again to be a new first signal which is further demodulated and decoded to obtain a signal of a user having the highest received power among the new first signal.

Figure 9:
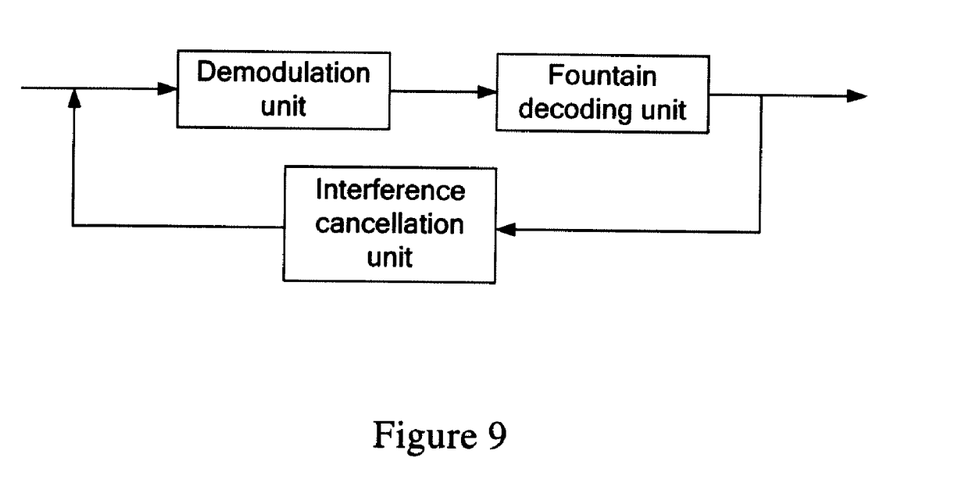
FIG. 9 is a schematic diagram illustrating an internal structure of a receiving end according to another embodiment the present invention.

As described above, if the data packet sent by the sending end is encoded by fountain codes, the internal structure of the receiving end is shown in FIG. 9 which is a schematic diagram illustrating the internal structure of the receiving end according to another embodiment the present invention. Compared with the internal structure of the receiving end shown in FIG. 8, the receiving end further includes: a fountain decoding unit connected with the demodulation unit and the interference cancellation unit. The fountain decoding unit is configured to perform fountain decoding for the data packet from the demodulation unit to obtain a whole data frame sent by a corresponding user. Further, the fountain decoding unit is configured to decode a data packet decoded unsuccessfully before according to correlation between data packets to restore a correct data packet, and send the received data packet and the restored correct data packet to the interference cancellation unit in which the interference cancellation is performed for the first signals.

In the above embodiments, the method of physical resource reuse, the apparatus of physical resource allocation and the receiving end make use of far-near effect of a cellular system and frequency-selective fading of a multi-carrier system to schedule the users. Each user terminal may send data using the maximum power without a complicated power control mechanism. Therefore, the user does not need to lower its transmission power, and performance loss is thus avoided. Therefore, the choices become more and more accompanying with the increase of the number of users; and thus, greater gains of system throughput are obtained. In addition, the interference cancellation is performed for each user by fountain codes, which to some extent solves the problem that a user having lower power can not be decoded if a user having higher power is unsuccessfully decoded. Therefore, the performance of the user having the lower power is further improved.

To further describe the performance of the method of uplink physical resource reuse in the embodiments of the present invention, the method according to embodiments of the present invention is simulated. Parameters of a simulation model are shown in Table 1. It is supposed that users are distributed uniformly in a cell and that a channel model is a TU6 channel, a model of affection of a channel estimation error is set up.

TABLE 1

| Parameter name | Parameter value | Note |
|---|---|---|
| Link direction | Uplink | |
| Carrier frequency | 3.5 GHz | |
| Bandwidth | 5 MHz | |
| The number of subcarriers used | 300 | Excluding direct current carrier |
| Subcarrier bandwidth | 15 KHz | |
| Antenna height of base station | 15 meters | |
| Mobility speed | 0.5 Km/h | |
| Cell radius | 144, 288, 433, 577meters | |
| Modulation mode and coding rate | Turbo code + 4, 16, 64 QAM | Code rate: $1/3$, $1/2$, $2/3$, $3/4$, $4/5$ |
| Thermal noise power density | −174 dBm/Hz | |
| Mobile station transmission power | 21dBm | |
| Noise figure of base station | 5 dB | |
| Size of physical resource block | 12 subcarriers | 25 resource blocks per OFDM symbol |
| Size of TTI | 14 OFDM symbols | Duration 1 ms |
| The number of antennae | The base station and the mobile station is 1 | |
| Target block error rate | 0.1 | |
| The number of users | 30 | |

Figure 10:
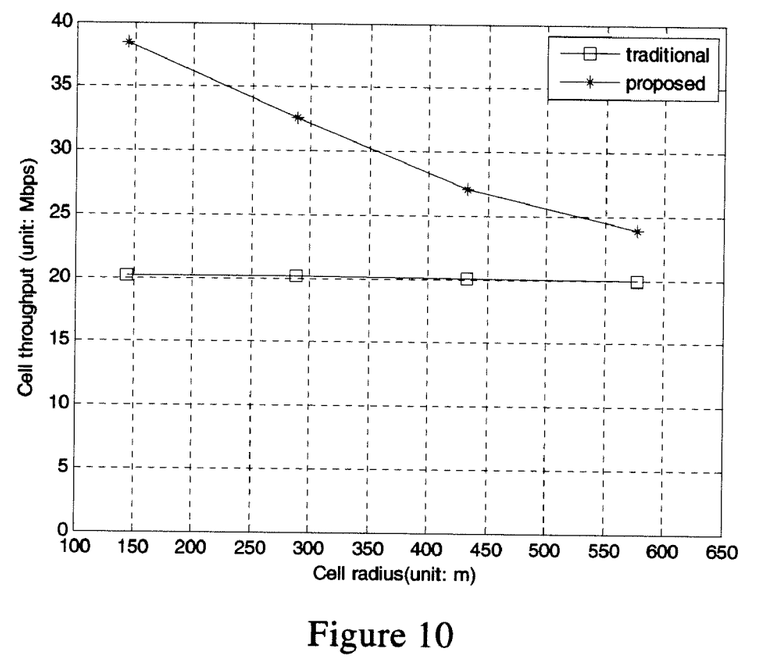
FIG. 10 is a schematic diagram illustrating a comparison of two relation curves between cell throughput and a cell radius, one being the relation curve when the Greedy scheduling scheme according to an embodiment of the present invention is used and the other being the relation curve when a conventional method of physical resource allocation with Greedy scheduling is used.
Figure 11:
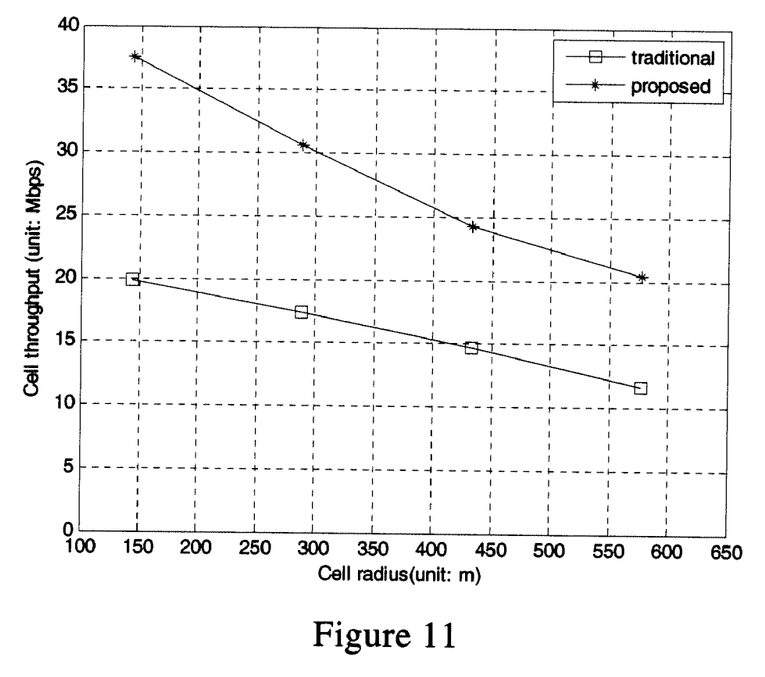
FIG. 11 is a schematic diagram illustrating a comparison of two relation curves between cell throughput and a cell radius, one being the relation curve when the PF scheduling scheme according to an embodiment of the present invention is used and the other being the relation curve when a conventional method of physical resource allocation with PF scheduling is used.

FIG. 10 is a schematic diagram illustrating a comparison of two relation curves between cell throughput and a cell radius, one being the relation curve when the Greedy scheduling scheme according to an embodiment of the present invention is used and the other being the relation curve when a conventional method of physical resource allocation with Greedy scheduling is used. FIG. 11 is a schematic diagram illustrating a comparison of two relation curves between cell throughput and a cell radius, one being the relation curve when the PF scheduling scheme according to an embodiment of the present invention is used and the other being the relation curve when a conventional method of physical resource allocation is used. The curve having stars represents the relationship between the cell throughput and the cell radius when the method according to an embodiment of the present invention is used; the curve having squares represents the relationship between the cell throughput and the cell radius when a conventional method of physical resource allocation is used. As can be seen from FIGS. 10 and 11, compared with the conventional technical scheme, the technical scheme according to the embodiment of the present invention may improve the spectrum efficiency greatly by reusing the frequency resources, and thus improve the throughput of a wireless communication system.

Figure 12:
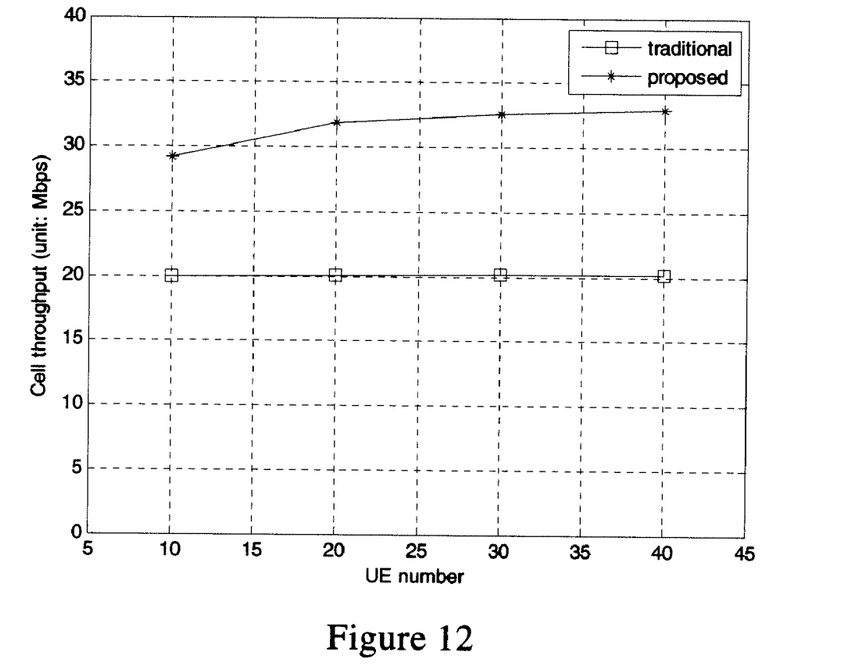
FIG. 12 is a schematic diagram illustrating a comparison of two relation curves between cell throughput and the number of users in the cell, one being the relation curve when the Greedy scheduling scheme according to an embodiment of the present invention is used and the other being the relation curve when a conventional method of physical resource allocation with Greedy scheduling is used.
Figure 13:
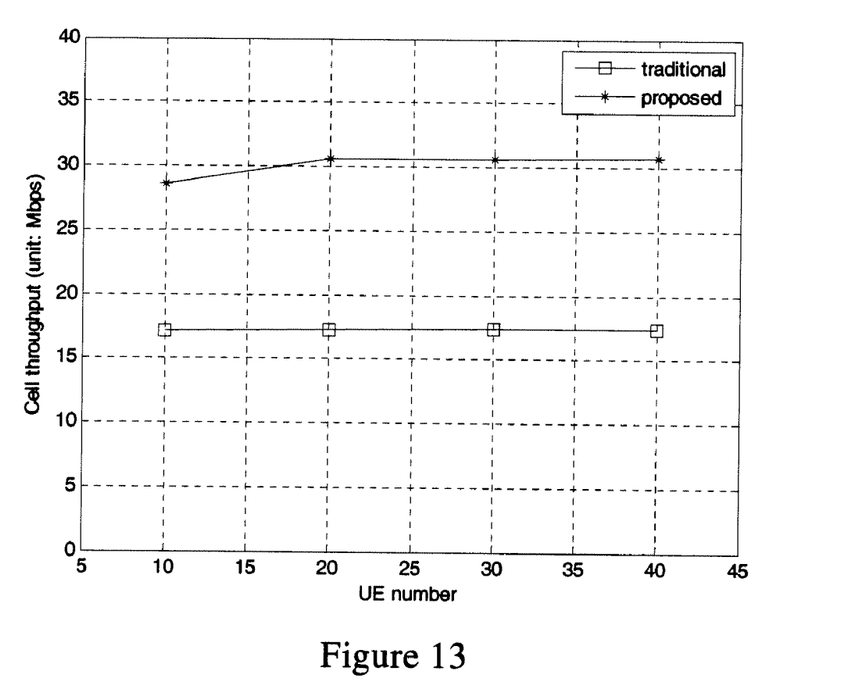
FIG. 13 is a schematic diagram illustrating a comparison of two relation curves between cell throughput and the number of users in the cell, one being the relation curve when the PF scheduling scheme according to an embodiment of the present invention is used and the other being the relation curve when a conventional method of physical resource allocation with PF scheduling is used.

FIG. 12 is a schematic diagram illustrating a comparison of two relation curves between cell throughput and the number of users in the cell, one being the relation curve when the Greedy scheduling scheme according to an embodiment of the present invention is used and the other being the relation curve when a conventional method of physical resource allocation with Greedy scheduling is used. FIG. 13 is a schematic diagram illustrating a comparison of two relation curves between cell throughput and the number of users in the cell, one being the relation curve when the PF scheduling scheme according to an embodiment of the present invention is used and the other being the relation curve when a conventional method of physical resource allocation with PF scheduling is used.

The curve having stars represents the relationship between the cell throughput and the cell radius when the method according to an embodiment of the present invention is used; the curve having squares represents the relationship between the cell throughput and the cell radius when a conventional method of physical resource allocation is used. As can be seen from FIGS. 12 and 13, compared with the conventional technical scheme, the technical scheme according to the embodiment of the present invention may improve the spectrum efficiency greatly by reusing the frequency resources, and thus improve the throughput of a wireless communication system. Furthermore, the larger the number of users is, the greater gains of system throughput are obtained, because the larger the number of users is, the more choices are during the process of scheduling.

The foregoing description is only the embodiments of the present invention and is not for use in limiting the protection scope thereof. All the modifications, equivalent replacements or improvements in the scope of the principle of the present invention should be included in the protection scope of the present invention.

What is claimed is:

1. A method of data receiving in a wireless communication system, comprising:
   demodulating and decoding a first signal received to obtain a first data packet of a user having highest received power;
   removing the first data packet from the first signal to generate a second signal if the first signal includes signals of more than two users; and
   demodulating and decoding the second signal to obtain a second data packet of a user having highest received power from the second signal, and taking the second signal as a new first signal which is processed similar to the first signal;
   wherein removing the first data packet comprises:
      modulating the first data packet to regenerate a sent signal of the user having the highest received power,
      convoluting the regenerated sent signal and a channel impulse response corresponding to the user, and restoring a received signal of the user received by a base station in a channel condition in which the sent signal is sent, and
      subtracting the restored received signal from the first signal.

2. The method of claim 1, further comprising:
   determining whether the number of data packets decoded successfully meets a requirement of fountain decoding;
   if the number of the data packets decoded successfully does not meet the requirement of the fountain decoding, performing said removing the first data packet from the first signal to generate the second signal;
   if the number of data packets decoded successfully meets the requirement of the fountain decoding, performing the fountain decoding for the data packets decoded successfully to obtain a whole data frame sent by a corresponding user, restoring a correct data packet which is unsuccessfully decoded before according to correlation between data packets, and performing said removing based on the restored correct data packet.

3. A receiving end in a wireless communication system, comprising:
   a demodulation unit, configured to demodulate and decode a first signal to obtain a first data packet of a user having highest received power;
   an interference cancellation unit, configured to modulate the first data packet to regenerate a sent signal of the user having the highest received power, convolute the regenerated sent signal and a channel impulse response corresponding to the user, restore a received signal of the user received by a base station in a channel condition in which the sent signal is sent, subtract the restored received signal from the first signal if the first signal includes signals of more than two users to generate a second signal, and input the second signal to the demodulation unit again as a new first signal.

4. The receiving end of claim 3, further comprising:
a fountain decoding unit connected with the demodulation unit and the interference cancellation unit, configured to perform fountain decoding for the first data packet to obtain a whole data frame sent by the user, decode a data packet which is not decoded successfully again according to correlation between data packets to restore a correct data packet, and send the first data packet and the restored correct data packet to the interference cancellation unit.

* * * * *